Patented Feb. 24, 1931

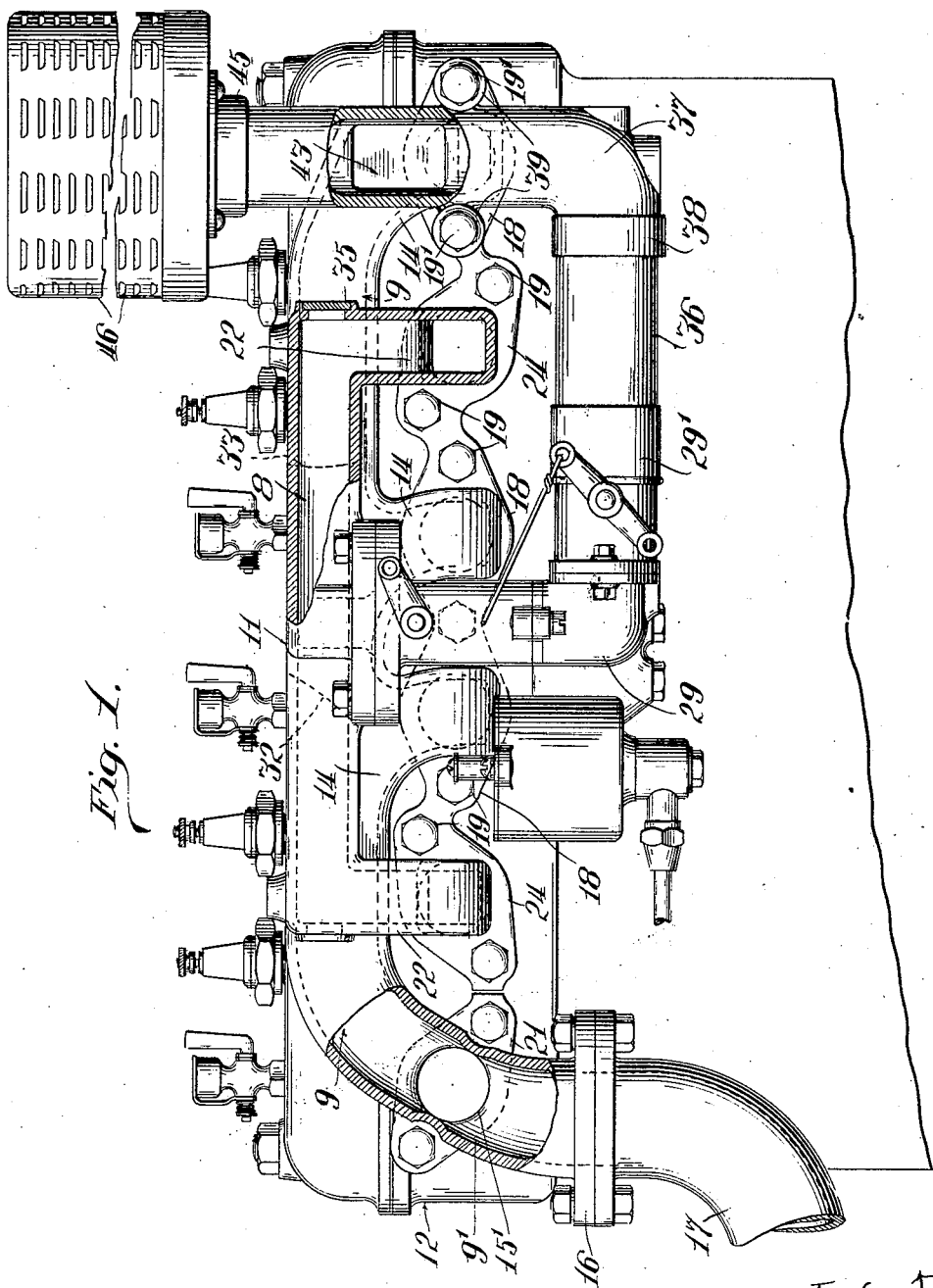

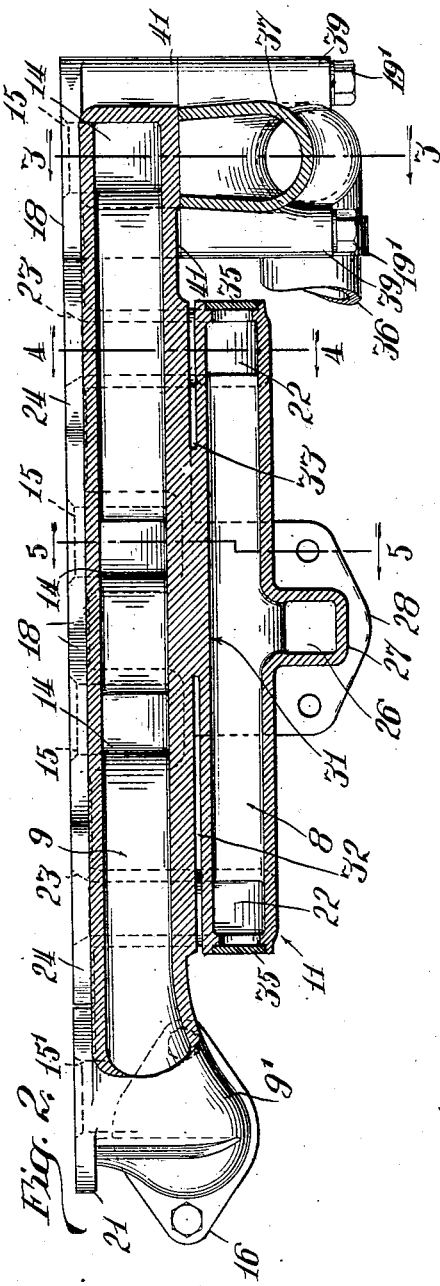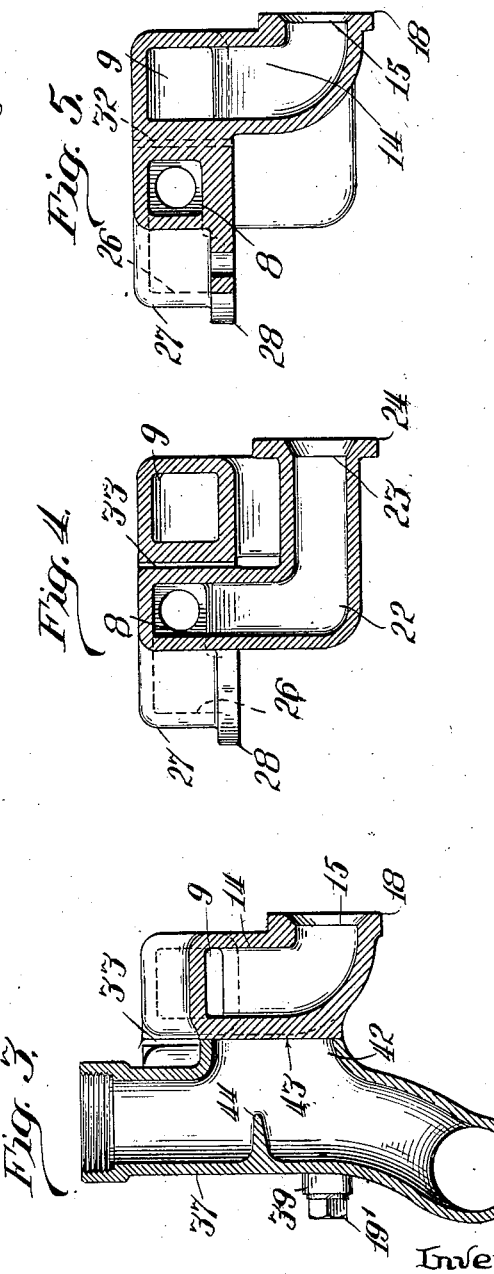

1,793,527

UNITED STATES PATENT OFFICE

BERGER STOCKFLETH, OF BERRIEN SPRINGS, AND FREDERICK W. BURGER, OF NILES, MICHIGAN, ASSIGNORS TO CLARK TRUCTRACTOR COMPANY, OF BUCHANAN, MICHIGAN, A CORPORATION OF MICHIGAN

MANIFOLD FOR INTERNAL-COMBUSTION ENGINES

Application filed April 29, 1926. Serial No. 105,447.

The present invention relates to manifolds for internal combustion engines, and has for its objects to provide an improved construction of manifold and cooperating parts in which the intake manifold passageway and the exhaust manifold passageway are both formed as a unitary casting; in which the exhaust manifold passageway supplies heat to a hot-spot in said intake manifold passageway through a wall common to both passageways; in which differential expansion of the two passageways is permitted; in which all tendency of the mixture to condense and puddle in the intake manifold passageway is eliminated; and in which the incoming air is first cleaned and preheated before being supplied to the carburetor.

Referring to the accompanying drawings, illustrating a preferred embodiment of our invention:

Figure 1 is a side elevational view of an internal combustion engine with the manifold unit mounted thereon, portions of this manifold being broken away;

Fig. 2 is a horizontal sectional view through this manifold unit; and

Figs. 3, 4 and 5 are transverse sectional views taken on the planes of the lines 3—3, 4—4 and 5—5, respectively, of Fig. 2.

The intake manifold 8 and the exhaust manifold 9 are both formed as integral parts of a single casting designated 11 in its entirety. As best shown in Fig. 2, both manifolds 8 and 9 are formed side by side in the same horizontal plane, with the exhaust manifold 9 in proximity to the engine 12 and the intake manifold 8 disposed on the outer side thereof. Both manifold passageways are preferably of rectangular cross section, as shown in Figs. 4 and 5, this construction affording passageways of the necessary cross sectional area in a relatively small unit and avoiding the use of excess metal in casting both manifolds in unit form.

Extending down from the exhaust manifold 9 at spaced points along its length, are branch connections 14 having ports 15 in the ends thereof adapted to be placed in registry with the exhaust ports in the side of the engine block. The downwardly curving discharge end 9' of the exhaust manifold has a similar port 15' therein, four of such ports 15—15' being shown corresponding to a four cylinder engine, although any number of such ports may be provided for other types of engines. The discharge end 9' of the exhaust manifold has a bolting flange 16 thereon for bolting to the flanged end of the exhaust pipe 17 leading to the muffler.

The branch connections 14 all have bolting flanges 18 at their ends for receiving cap screws 19 which thread into holes in the engine block. These bolting flanges are preferably formed integral with the bolting flanges on the ends of the intake branch connections, which latter connections will be presently described. The end exhaust port 15' is held in communication with the corresponding cylinder port by a similar bolting flange 21.

The intake manifold 8 similarly has a plurality of branch connections 22 provided with ports 23 at their ends adapted to register with the intake ports in the side of the cylinder block. Two of these intake branch connections have been shown corresponding to standard practice for four cylinder engines, both of these branch connections leading from the extreme ends of the manifold. Obviously, a larger number of branch connections may be employed for other types of engines.

Attention is directed to the fact that both of these branch connections lead downwardly from the manifold passageway 8, whereby any fuel condensing on the walls of this manifold 8 will have a gravitational flow down through these branch connections to the engine ports. This avoids puddling of condensed fuel in the manifold, and hence minimizes loading in the manifold and sluggishness in acceleration response.

The branch connections 22 leading from the intake manifold, extend downwardly and under the exhaust manifold 9 and have bolting flanges 24 at their ends for receiving the cap screws 19. As clearly shown in Fig. 1, these two flanges 24 are formed integral with the bolting flanges 18 of the exhaust branch connections 14. By thus constructing the bolting flanges of both sets of branch connections integral, the entire casting and particularly the branch connections are greatly reenforced against breakage. The two flanges 24 are preferably inclined or staggered relative to the other flanges, as shown in Fig. 2, to space their cap screws 19 from the cap screws of the adjacent flanges 14. The bolting flange 21 of the end exhaust port 15′ is preferably separated from the integral series of flanges heretofore described.

The mixture enters the intake manifold 8 through an inlet passageway 26 cored out in a projecting portion 27 formed integrally with the front wall of the intake manifold intermediate its ends. This projecting portion has a bolting flange 28 at its lower end, to which is fastened the carburetor 29. The carburetor illustrated is of the vertical type, but it will be understood that if a horizontal type of carburetor is to be used, the carburetor mounting portion 27 would be formed with a straight horizontal passageway 26 and with a vertical bolting flange. This inlet passageway 26 enters the intake manifold through the front wall thereof, whereby the fuel entering the manifold, under the relatively high velocity of the air stream, will be caused to impinge against the rear side wall of the manifold in the zone or region generally indicated at 31. It is this zone or area of the rear manifold wall that functions as a hot-spot for vaporizing the fuel particles impinging against the same. Heat is conducted to this hot-spot from the exhaust manifold by a common wall which constitutes the front wall of the exhaust manifold and the rear wall of the intake manifold and which integrally unites both manifolds. It will be observed that the two manifolds are only joined by this section of common wall along a relatively short length of the intake manifold, this joining portion into which the adjacent walls of the manifolds merge being confined to the intermediate portion of the intake manifold substantially opposite the inlet passageway 26. The ends of the intake manifold are separated from the exhaust manifold by slots or spaces 32 and 33. It is desirable to separate the ends of the intake manifold from the exhaust manifold in this manner, because of the differential expansions of the two manifolds. The intake manifold is maintained considerably cooler than the exhaust manifold in consequence of the flow of combustible mixture therethrough and we have found that if both manifolds are joined along the entire length of the intake manifold there is the likelihood of the casting cracking adjacent the ends of the intake manifold because of these differential expansions. These slots or openings 32—33 may be formed in the casting in the molding thereof, but we find it more desirable to cast the double manifold with a solid wall joining the two manifolds and to thereafter form these slots 32—33 by sawing through this solid wall from the ends of the intake manifold, substantially as indicated. Thus, the ends of the intake manifold can expand in each direction from the intervening web of metal between the inner ends of these saw slots. This intervening web of metal will conduct sufficient heat to the hot-spot 31 to maintain it at an adequate fuel vaporizing temperature. It will be noted that the outlet from the exhaust manifold is at one end thereof, and that the slot 32 adjacent such exhaust outlet is longer than the slot 33 adjacent the opposite ends of the manifold, so that the heating surface provided by the common wall or hot-spot 31 extends considerably further to the right as viewed in Fig. 2, i. e., away from the outlet end of the exhaust manifold. As the exhaust heat increases as each cylinder discharges its exhaust into the exhaust passage, the greatest heat will be in the end of the exhaust passage nearest the outlet. Obviously, therefore, more heat will be available at the latter end, and consequently the slot 33 is made shorter than the slot 32 to allow more metal contact where the heat is the least, so that the incoming mixture will be heated as nearly uniformly as possible to get the best distribution of the mixture to each cylinder.

To facilitate casting the unit, the ends of the intake manifold 8 are left open in order that the core molds may be removed from such manifold through these open ends, which are thereafter plugged, as by driving expanding plugs 35 into them.

The present invention also embodies improved means for cleaning and preheating air before it enters the carburetor, this preheating means drawing its heat from the exhaust manifold 9. The air inlet 29′ of the carburetor 29 communicates through a short section of conduit 36 with the discharge end of a stove or air preheating conduit 37, the latter having a flanged elbow 38 into which the end of the conduit 36 is extended. This air preheating conduit 37 is mounted vertically at the front end of the manifold, being supported by apertured bosses 39 formed along opposite sides thereof. These bosses register with apertured bosses 41 extending forwardly from the bolting flange 18 of the end exhaust branch connection 14. Two relatively long cap screws 19′ pass through alined openings in the bosses 39 and 41 and thread into tapped holes in the cylinder block, thus rigidly holding the preheating conduit 37 against the end branch of the exhaust manifold, as clearly shown in Fig. 3. It will be evident that the stove or conduit 37 will thus absorb considerable heat from the exhaust manifold, but we preferably augment this heating action of the stove or conduit by so constructing the same that air passing therethrough is deflected into direct heat absorbing contact with the exhaust manifold. As shown in Fig. 3, conduit 37 is formed with a rearwardly projecting extension 42 having an open side which abuts directly against a flat surface 43 formed on the front wall of the exhaust branch 14. At a point opposite the surface 43, the conduit 37 is formed with a transversely extending internal rib 44 which deflects the air flowing downwardly through the conduit into heat absorbing contact with the surface 43. The heat absorbing contact between the air and this heat absorbing surface 43 is only momentary, but this is ample to preheat the air to the desired temperature, it being noted that the wall 43 is in the direct path of the exhaust gases issuing from the exhaust port of the engine.

The upper end of the preheating conduit 37 is provided with a flange or collar 45 on which is mounted an air cleaner 46. The particular form of cleaner shown is of the self-cleaning type, and for maximum efficiency it is desirable that it be supported in the erect position shown. This erect mounting of the air cleaner cooperates with the vertical position of the preheating conduit 37 across the end of the exhaust manifold and results in a compact, highly efficient arrangement of parts.

This assembly has been used with marked success for industrial trucks and tractors where compactness and regularity of performance are essential. In this particular field it is also extremely desirable that the most complete combustion possible be obtained. These vehicles are often employed entirely in closed buildings and if combustion is faulty, the exhaust gases become exceedingly obnoxious. We have found that by preheating the air in the manner described, and then vaporizing the heavy particles of fuel against the hot-spot 31, the mixture enters the cylinders in a condition most conducive to complete combustion. Furthermore, as before described, there is no possibility of the intake manifold loading with accumulated charges of condensed fuel (because of the straight horizontal flight of the intake manifold and the downward direction of the branch connections 22), and thus heavy exhaust fumes usually resulting from a loaded manifold are avoided.

The particular construction herein illustrated and described represents a preferred embodiment of our invention, but we do not wish to be limited to the particular details thereof except as they are defined in the more restricted of the following claims.

What we claim as our invention, and desire to secure by Letters Patent of the United States, is:

1. In combination, an intake manifold, an exhaust manifold having an outlet adjacent to one end thereof, the end portions of said manifolds being spaced apart, and a connecting wall integrally joining said manifolds intermediately of the length thereof and further from the exhaust outlet than from the opposite end of the exhaust manifold, said connecting wall conducting heat to a hot-spot in said intake manifold.

2. In combination, a unitary casting, comprising an intake manifold, and an exhaust manifold, the adjacent walls of said manifolds being joined intermediately by a connecting web portion, the end portions of said intake manifold at opposite sides of said web portion being of unequal length, and being separated from said exhaust manifold for differential expansion.

3. In combination, a unitary casting, comprising an intake manifold, and an exhaust manifold, disposed in substantially parallel planes, the outer wall of one manifold being integrally joined intermediately to the inner wall of the other manifold through a connecting web portion, said connecting web portion conducting heat to a hot-spot in the intake manifold, and slots of unequal length separating the ends of the manifolds for differential expansion.

4. In combination, intake and exhaust manifolds, the outer wall of one manifold being integrally joined to the adjacent wall of the other manifold and a slot in said connecting wall for separating the end of one of said manifolds from the other manifold.

5. In combination, intake and exhaust manifolds disposed in substantially the same horizontal plane, the outer wall of one manifold being integrally joined to the adjacent wall of the other manifold and slots through said connecting wall extending from the ends of one of said manifolds to points adjacent the center thereof.

6. In combination, parallel intake and exhaust manifolds having their end portions spaced apart, branch connections extending from each of said manifolds and bolting flange means at the ends of said branch connections integrally joining said branch connections together.

7. In combination, parallel intake and exhaust manifolds having their end portions spaced apart, branch conduits leading from each of said manifolds for connection to the engine ports and bolting flange means at the ends of said branch conduits, said flange means being integrally joined between a plurality of said branch conduits.

8. In combination, a unitary casting comprising parallel intake and exhaust manifolds, having their end portions spaced apart, and branch connections extending downwardly from both of said manifolds, the lower ends of a plurality of said branch connections being integrally joined together.

9. In combination, a unitary casting comprising an intake manifold and an exhaust manifold disposed in substantially the same horizontal plane, the outer wall of one manifold being integrally joined to the inner wall of the other manifold through a connecting web portion, said connecting web portion conducting heat to a hot-spot in the intake manifold, a slot in said connecting web portion for separating the end of one of said manifolds from the other manifold, and branch connections leading from said intake manifold down under said exhaust manifold.

10. In combination, a unitary casting comprising an intake manifold and an exhaust manifold, an inlet passageway having a bolting flange for connecting to a carburetor, said inlet passageway entering said intake manifold through the outer side wall thereof, said manifolds being joined by a connecting web of metal disposed substantially opposite the point of entrance of said passageway into said manifold for creating a hot-spot in said intake manifold in line with said inlet passageway, and slots through said connecting web extending from the ends of one of said manifolds to points adjacent the center thereof.

11. In combination, intake and exhaust manifolds, said exhaust manifold having an outlet adjacent one end thereof, an inlet passageway having a bolting flange for connecting to a vertical type of carburetor, said inlet passageway entering said intake manifold through the outer side wall thereof, and means creating a hot-spot on the inner side wall of said intake manifold opposite the point of entrance of said inlet passageway, and at a point further from said exhaust outlet than from the opposite end of said exhaust manifold.

BERGER STOCKFLETH.
FREDERICK W. BURGER.